US006030482A

United States Patent [19]

Osaka

[11] Patent Number: 6,030,482

[45] Date of Patent: *Feb. 29, 2000

[54] LABEL CONTINUUM AND PRODUCING METHOD THEREOF

[75] Inventor: Shozo Osaka, Shijonawate, Japan

[73] Assignee: Petter Co., Ltd., Osaka-fu, Japan

[ * ] Notice: This patent is subject to a terminal disclaimer.

[21] Appl. No.: 08/915,948

[22] Filed: Aug. 21, 1997

Related U.S. Application Data

[62] Division of application No. 08/526,839, Sep. 11, 1995, Pat. No. 5,723,190.

[30] Foreign Application Priority Data

| | | | |
|---|---|---|---|
| Sep. 14, 1994 | [JP] | Japan | 6-247188 |
| Dec. 22, 1994 | [JP] | Japan | 6-336321 |
| Dec. 22, 1994 | [JP] | Japan | 6-336322 |
| Dec. 22, 1994 | [JP] | Japan | 6-336323 |
| Dec. 22, 1994 | [JP] | Japan | 6-336324 |

[51] Int. Cl.$^{7}$ .............................. B32B 31/00; B32B 9/00; B44C 1/165; B41M 3/12

[52] U.S. Cl. .......................... 156/289; 156/230; 156/247; 156/264; 428/40.1; 428/41.8; 428/42.1; 428/352; 428/914

[58] Field of Search ..................................... 156/230, 231, 156/234, 235, 237, 238, 239, 240, 241, 247, 248, 250, 264, 277, 289; 428/40.1, 41.2, 41.4, 41.6, 41.7, 41.8, 42.1, 42.2, 42.3, 43, 852, 202, 195, 211, 354, 906, 914

[56] References Cited

U.S. PATENT DOCUMENTS

| | | | |
|---|---|---|---|
| 3,630,802 | 12/1971 | Dettling | 156/231 |
| 3,650,880 | 3/1972 | Tieniber | 161/89 |
| 4,345,954 | 8/1982 | Panchu | 156/87 |
| 4,420,515 | 12/1983 | Amon et al. | 428/29 |
| 4,720,317 | 1/1988 | Kuroda et al. | 156/250 |
| 5,000,809 | 3/1991 | Adesko et al. | 156/230 |
| 5,183,696 | 2/1993 | Sanderson | 428/194 |
| 5,292,713 | 3/1994 | Stenzel et al. | 503/226 |
| 5,354,588 | 10/1994 | Mitchell et al. | 428/40 |
| 5,508,247 | 4/1996 | Tran et al. | 503/200 |
| 5,855,722 | 1/1999 | Osaka | 156/277 |
| 5,895,705 | 4/1999 | Crouch et al. | 156/247 |

FOREIGN PATENT DOCUMENTS

| | | |
|---|---|---|
| 579423 | 1/1994 | European Pat. Off. . |
| 600622 | 6/1994 | European Pat. Off. . |

OTHER PUBLICATIONS

Skeist, I. ed., "Handbook of Adhesives". Van Nostrand Reinhold., pp. 533, 716, 1990.

*Primary Examiner*—Richard Crispino
*Assistant Examiner*—J. A. Lorengo
*Attorney, Agent, or Firm*—Jordan and Hamburg LLP

[57] ABSTRACT

This invention relates to a label continuum comprising a long label substrate, an adhesive layer formed on the back thereof, a heat-sensitive developing layer formed on the surface of the label substrate and a release layer formed on the surface of the label substrate opposite to the adhesive layer when the label substrate is rolled up.

The invention also relates to a producing method of the label continuum which comprises a step 1 of preparing a process sheet with at least either surface thereof having a releasability and forming an adhesive layer on the release surface of the process sheet, a step 2 of preparing a long label substrate with the back to which the adhesive layer is transferred and stuck and of mating together the back of the label substrate and the adhesive layer of the process sheet, a step 3 of forming a release layer on the surface of the label substrate, a step 4 of releasing only the process sheet from the surface of the adhesive layer transferred to the back of the label substrate, and a step 5 of rolling up the label substrate so that the release layer and the adhesive layer are false-stuck to each other.

19 Claims, 7 Drawing Sheets

14
16
18
21a
21b
22
24
24a
30
32
110
115
117
120
122a
122b
124
126
130
132
140

LABEL CONTINUUM AND PRODUCING METHOD THEREOF

This is a division of application Ser. No. 08/526,839, filed Sep. 11, 1995 now U.S. Pat. No. 5,723,190 issued Mar. 3, 1998.

BACKGROUND OF THE INVENTION

1. Field of the Invention

The present invention relates to a label continuum formed of a plurality of continued labels and a producing method thereof and, in particular, the so-called non-separable type of label continuum with no release paper which is particularly suitable for e.g. price tag or bar-code label and a producing method thereof.

2. Description of the Prior Art

As a so-called non-separable label with no release paper, there has hitherto been a label with a delayed tack type of heat-active pressure-sensitive adhesive layer formed on the back of a heat-resistant substrate.

Such continuum of labels with a heat-active type of pressure-sensitive adhesive layer formed on one side thereof can be used in a rolled form without any release paper on the back side thereof. That is to say, if such continuum of labels are rolled up, they don't adhere because such a label has no adhesiveness before pressure sensitivity is imparted by melting the sensitive layer. Such prior art non-separable type label, however, requires a large-scale producing equipment, which is inevitably expensive, and the label's substrate is required to be heat-resistant such as paper since it has to be heated to activate the adhesive agent.

Further, the substrate is required to be safe against any of the components of the adhesive forming the adhesive layer, consequently, the width of selection is quite limited.

SUMMARY OF THE INVENTION

Therefore, the object of the present invention is to widen the range of selection for the label substrate and the adhesive layer, to provide a label continuum which can be produced in a variegated small lot fashion and a producing method thereof.

A first aspect of the invention relates to a label continuum comprising a long label substrate, an adhesive layer formed on the back of the label substrate, a heat-sensitive developing layer formed on the surface of the label substrate and a release layer formed on the surface of the label substrate opposite to the above-described adhesive layer when the label substrate is rolled up. In the first aspect of the invention, the label substrate has formed on its opposite side a heat-sensitive developing layer which is developed when heated. According to the first aspect of the invention, the adhesive layer is formed on the back of the label substrate, hence the adhesive layer can be formed on the surface of label substrate at the room temperature. When a label substrate is selected, therefore, it is all right even if it is an extremely thin tape relatively low in heat resistance. And, since the solvent or the like in the dissolved adhesive agent is removed before the adhesive layer is formed and prior to transfer thereof, the range of adhesives to be selected for formation of the adhesive layer can be broadened regardless of the label substrate's properties. Further, as the label substrate may be selected a thermal paper made to develop when heated, while as printer may be used any kind thereof including those by the use of a transfer foil which requires rather intensive heating.

A second aspect of the invention relates to a label continuum comprising a long label substrate, an adhesive layer formed on the back of the label substrate, a heat-sensitive developing layer formed on the surface of the label substrate, a printed layer formed on the surface of the heat-sensitive developing layer on the surface of the label substrate and a release layer formed on the surface of the label substrate opposite to the adhesive layer when the label substrate is rolled up. In the second aspect of the invention, the heat-sensitive developing layer is formed on the surface opposite to that the adhesive layer is formed thereon, hence development takes place upon heating. According to the second aspect of the invention, the adhesive layer is formed on the back of the label substrate, hence the adhesive layer can be formed on the surface of the label substrate at the room temperature. When a label substrate is selected, therefore, it is all right even if it is an extremely thin tape relatively low in heat resistance. And, since the solvent or the like in the dissolved adhesive agent is removed before the adhesive layer is formed and prior to transfer thereof, the range of adhesives to be selected for formation of the adhesive layer can be broadened regardless of the label substrate's properties. Further, as the label substrate may be selected a thermal paper made to develop when heated, while as printer may be used any kind thereof including those by the use of a transfer foil which requires rather intensive heating.

In the first or the second aspect of the invention, the release layer may as well be formed by printing or coating of a release agent. In this invention, the label substrate is unrolled, for it is rolled up with the release layer formed on the surface of the label substrate and the adhesive layer on the back thereof false-stuck to each other. According to this invention, since the release agent is printed or coated to the surface of the label substrate or of the printed layer, unrolling takes place even when adhesive layer formed on the back of the label substrate and the release layer on the surface thereof, each layer oppositely false-stuck, hence the label can be cut off piecewise from the label continuum.

In the first or the second aspect of the invention, the release layer may as well be formed by lamination of a film or sheet excelled in releasability. In this invention, the label substrate is unrolled, for it is rolled up with the release layer formed on the surface of the label substrate and the adhesive layer on the back thereof false-stuck to each other. According to this invention, since the release layer is formed by lamination of a film or sheet excelled in releasability on the label substrate, unrolling takes place even when the release layer on the surface of the label substrate and adhesive layer formed on the back thereof, each layer oppositely false-stuck, hence the label can be cut off piecewise from the label continuum.

A third aspect of the invention relates to a label continuum comprising a long label substrate, an adhesive layer formed on the back of the label substrate, a heat-sensitive developing layer formed on the surface of the label substrate and a printed layer excelled in releasability formed on the surface of the label substrate opposite to the adhesive layer. In the third aspect of the invention, the label substrate has formed thereon the heat-sensitive developing layer on the side opposite to the adhesive layer side, hence it is developed on heating. According to the third aspect of the invention, the adhesive layer is formed on the back of the label substrate, hence the adhesive layer can be formed on the label substrate at the room temperature. When a label substrate is selected, therefore, it is all right even if it is an extremely thin tape relatively low in heat resistance. And, since the solvent and the like in the dissolved adhesive agent is removed before the adhesive layer is formed and prior to transfer thereof, the range of adhesives to be selected for formation of the adhesive layer can be broadened regardless of the label substrate's properties. Further, as the label substrate may be selected a thermal paper made to develop when heated, while as printer may be used any kind thereof including those by the use of a transfer foil which requires rather intensive heating.

In the third aspect of the invention, the printed layer may as well be formed with a printing ink by printing or coating. In this invention, the rolled up label substrate is unrolled, for the label substrate is rolled up such that the printed layer excelled in releasability is formed on the surface of the label substrate and is false-stuck to the adhesive layer formed on the back of the label substrate. According to this invention, the printed layer excelled in releasability is formed on the surface of the label substrate, hence even if the label substrate is rolled up such that the adhesive layer formed on the back of the label substrate and the printed layer formed on the surface thereof are oppositely false-stuck, the label substrate can be unrolled and labels can be cut piecewise from the label continuum.

In the third aspect of the invention, the release layer may as well be formed together with the printed layer on the surface of the label substrate opposed to the adhesive layer when the label substrate is rolled up. In this invention the printed layer is formed on the surface of the label substrate and on the surface of this label substrate the release layer excelled in releasability is formed, hence even if the label substrate is rolled up with the printed layer and/or release layer formed on the surface thereof and the adhesive layer formed on the back side are oppositely false-stuck to each other, the label substrate is unrolled and the individual labels can be cut piecewise from the label continuum.

A fourth aspect of the invention relates to a label continuum comprising a long label substrate, an adhesive layer transferred to the back of the label substrate to be formed thereon and a release layer formed on the surface of the label substrate and the label substrate is so rolled up that the release layer and the adhesive layer are false-stuck to each other. In the fourth aspect of the invention, since the label substrate is rolled up so that the release layer formed on the surface of the label substrate and the adhesive layer formed on the back thereof are oppositely false-stuck to each other, it can be unrolled with ease. According to the fourth aspect of the invention, the adhesive layer is formed on the back of the label substrate, hence the adhesive layer can be formed on the surface of the label substrate at the room temperature. When a label substrate is selected, therefore, it is all right even if it is an extremely thin tape relatively low in heat resistance. And, since the solvent and the like in the dissolved adhesive agent are removed before the adhesive layer is formed and prior to transfer thereof, the range of adhesives to be selected for formation of the adhesive layer can be broadened regardless of the label substrate's properties. Further, as the label substrate may be selected a thermal paper made to develop when heated, while as printer may be used any kind thereof including those by the use of a transfer foil which requires rather intensive heating.

In the fourth aspect of the invention, the printed layer may be formed on the surface of the label substrate and the release layer may be formed on the surface of the printed layer. In this invention, since the printed layer is formed on the surface of the label substrate, and the release layer is formed on the surface of the printed layer, the rolled up label substrate can be unrolled with ease. According to this invention, the printed layer is formed on the surface of the label substrate and the release layer is formed on the surface of the printed layer, hence if the label substrate is rolled up with the adhesive layer formed on the back of the label substrate and the release layer formed on its surface are oppositely false-stuck to each other, the label substrate is unrolled and the individual labels can be cut off piecewise from the label continuum.

In the fourth aspect of the invention, the printed layer may be formed on the release layer and on the label substrate and the printed layer may be formed with a printing ink excellent in releasability. In this invention, since the printed layer is formed on the release layer and on the label substrate and the printing ink used is excelled in releasability, the rolled label substrate can be unrolled with ease. According to this invention, the printed layer is formed on the release layer which is formed on the surface of the label substrate, and the printed layer is formed with the printing ink excellent in releasability, hence if the label substrate is rolled up with the release layer formed on the label substrate and the adhesive layer formed on the back thereof are oppositely false-stuck to each other, the label substrate is unrolled and the individual labels can be cut off piecewise from the label continuum.

In the fourth aspect of the invention, the label substrate may have formed thereon a heat-sensitive developing layer on the side opposite to the adhesive layer side of the label substrate. In this invention, since the heat-sensitive developing layer is formed on the side opposite to the adhensive layer side of the label substrate, development takes place when heated. According to this invention, the label substrate has formed thereon the heat-sensitive developing layer on the side opposite to the adhesive layer side of the label substrate, hence printing can be done by a thermal printer or the like with relative ease.

A fifth aspect of the invention relates to a method of producing a label continuum comprising a step 1 of preparing a process sheet having at least either of its surfaces releasable and of forming an adhesive layer on the process sheet's releasable surface, a step 2 of preparing a long label substrate with its back the adhesive layer is to be transferred and stuck to and of matting together the back of the label substrate and the adhesive layer of the process sheet, a step 3 of forming a release layer on the surface of the label substrate, a step 4 of releasing only the process sheet from the surface of the adhesive layer transferred to the back of the label substrate and a step 5 of rolling up the label substrate so that the release layer and the adhesive layer are false-stuck to each other. In the fifth aspect of the invention, the adhesive layer is formed on the label substrate's surface by the use of the process sheet having releasability, hence the adhesive layer is transferred to the surface of the long label substrate from the process sheet when it is pressed against the long label substrate. According to the fifth aspect of the invention, the adhesive layer formed on the surface of the process sheet having releasability and the surface of the long label substrate which the adhesive layer is transferred and stuck to are pressed together and the adhesive layer is transferred from the process sheet's surface to the back of the long label substrate at the room temperature, hence even if the label substrate is relatively low in heat resistance and extremely thin, an adhesive layer can be formed. Also, since the solvent contained in the adhesive agent for formation of the adhesive layer when it is in emulsion form is removed as the adhensive layer is formed, there is no risk of solvent or the like affecting the label substrate. Hence, the width of selection for the label substrates and adhesive agents for formation of the adhesive layers is by far greater and this is suited for variegated small lot production. The process sheet can be reused many times over, this being advantageous for reuse of resources as well as for dust saving.

A sixth aspect of the invention relates to a method of producing a label continuum comprising a step 1 of preparing a process sheet having at least either of its surfaces releasable and of forming an adhesive layer on the process sheet's releasable surface, a step 2 of preparing a long label substrate with its back the adhesive layer is to be transferred and stuck to and of matting together the back of the label substrate and the adhesive layer of the process sheet, a step 3 of forming a printed layer on the surface of the label substrate, a step 4 of forming the release layer on the surface of the label substrate, a step 5 of releasing only the process sheet from the surface of the adhesive layer transferred to the back of the label substrate and a step 6 of rolling up the label substrate so that the release layer and the adhesive layer are false-stuck to each other. In the sixth aspect of the invention, the adhesive layer is formed on the label substrate's surface by the use of the process sheet having releasability, hence the adhesive layer is transferred to the surface of the long label substrate from the process sheet when it is pressed against the long label substrate. According to the sixth aspect of the invention, the adhesive layer formed on the surface of the process sheet having releasability and the surface of the long label substrate which the adhesive layer is transferred and stuck to are pressed together and the adhesive layer is transferred from the process sheet's surface to the back of the long label substrate at the room temperature, hence even if the label substrate is relatively low in heat resistance and extremely thin, an adhesive layer can be formed. Also, since the solvent contained in the adhesive agent for formation of the adhesive layer when it is in emulsion form is removed as the adhesive layer is formed, there is no risk of solvent or the like affecting the label substrate. Hence, the width of selection for the label substrates and adhesive agents for formation of the adhesive layers is by far greater and this is suited for variegated small lot production. The process sheet can be reused many times over, this being advantageous for reuse of resources as well as for dust saving.

In the fifth or the sixth aspect of the invention, the step of releasing only the process sheet from the surface of the adhesive layer transferred to the back of the label substrate may include a step of slitting the label substrate and the process sheet together with other layers laminated in a previous step in a proper width. In this invention, the process sheet and the long label substrate are cut together with the other layers. Although if the adhesive layers are formed as a plurality of label substrates of the predetermined width, waste parts should occur in both side borders of each label substrate, it is possible in this invention that the long label substrate wider than the label substrates and process sheet are first prepared and then piled one upon another by the use of the adhesive layer and then slit to have its width adjusted to the predetermined value and it is possible to have the adhesive layer formed on the process sheet's surface having releasability and narrow margins on both right and left ends of the process sheet and the waste parts in both side borders are decreased, this enabling in formation of more label substrates of the predetermined width and being very useful.

In the fifth or the sixth aspect of the invention, the step of releasing only the process sheet from the surface of the adhesive layer transferred to the back of the label substrate may include a step of die-cutting to a proper width together with other layers laminated in a previous step. In this invention, the process sheet is not cut and the label substrate and other layer are cut together. According to this invention, the wide and long label substrate and the process sheet are prepared, these are laid one upon the other by means of adhesive layer and then die-cut the label substrates in a proper width. The label intended first can thus be properly formed, this being very useful.

In the fifth or the sixth aspect of the invention, the step of forming the release layer on the surface of the label substrate may include a step of printing or coating a release agent on the surface of the label substrate. In this invention, since the label substrate is rolled up for the release layer and the adhesive layer on the label substrate are false-stuck opposite to each other, the rolled up label continuum is unrolled. According to this invention, when an adhesive layer is formed on the releasable surface of the process sheet and then pressed against the back of the long label substrate which the adhesive layer is transferred to, the adhesive layer can be transferred from the process sheet to the back of the long label substrate by the action of the process sheet.

In the fifth and the sixth aspect of the invention, the step of forming the release layer on the surface of the label substrate may include a step of forming a release layer on the surface of the label substrate through lamination of films or sheets excelled in releasability. In this invention, since the label substrate is rolled up with the release layer and the adhesive layer thereof false-stuck to each other, the rolled up label continuum is unrolled. According to this invention, an adhesive layer is formed on the releasable surface of the process sheet and when the adhesive layer is transferred to the back of the long label substrate, it is possible to transfer the adhesive layer from the process sheet to the back of the long label substrate by the action of the process sheet excelled in releasability.

A seventh aspect of the invention relates to a method of producing a label continuum comprising a step 1 of preparing a process sheet having at least either of its surfaces releasable and of forming an adhesive layer on the process sheet's releasable surface, a step 2 of preparing a long label substrate with its back the adhesive layer is to be transferred and stuck to and of mating together the back of the label substrate and the adhensive layer of the process sheet, a step 3 of forming on the surface of the label substrate a printed layer excelled in releasability, a step 4 of releasing only the process sheet from the surface of the adhesive layer transferred to the back of the label substrate and a step 5 of rolling up the label substrate so that the release layer and the adhesive layer are false-stuck to each other. In the seventh aspect of the invention, the adhesive layer is formed on the surface of the sheet by the use of the process sheet having releasability, hence the adhesive layer is transferred from the process sheet to the surface of the long label substrate when they are put together. According to the seventh aspect of the invention, the adhesive layer formed on the surface of the process sheet having releasability and the surface of the long label substrate which the adhesive layer is transferred to, are put together and the adhesive layer is transferred from the surface of the process sheet to the back of the long label substrate at the room temperature, hence even if the label substrate is relatively low in heat resistance and extremely thin, the adhesive layer can be formed. Since the solvent contained in the adhesive agent for formation of the adhesive layer when it is in emulsion form is removed as it is transferred from the surface of the process sheet for formation of the adhesive layer, there is no risk of the label substrate being affected by solvent or the like. Hence, the width of selection for the label substrates and the adhesive agents for formation of the adhesive layer is quite large and the method of the invention is suited for variegated small lot production. The process sheet can be reused many times over, this being advantageous for reuse of resources as well as for dust saving.

In the seventh aspect of the invention, the step 5 may include a step of slitting the label substrate laminated in the steps 1–4 in a proper width and the process sheet together with other layers formed. In this invention, the process sheet and the long label substrate are cut together with other layers. Although if the adhesive layers are formed as a plurality of label substrates of the predetermined width, waste parts should occur in both side borders of each substrate, it is possible in this invention that first the long label substrates and process sheet are prepared and then they are piled one upon another by the use of the adhesive layer and then slit to have its width adjusted to the predetermined value and, it is possible to have the adhesive layer formed on the process sheet's surface having releasability and narrow margins on both right and left ends of the process sheet and the waste parts in both side borders are decreased, this enabling formation of more label substrates of the predetermined width, and being very useful.

In the seventh aspect of the invention, the step 5 may include a step of die-cutting the label substrates laminated in the steps 1–4 together with other layers in the predetermined width. In this invention, the process sheet is not cut, while the label substrate is cut together with the other layers. According to this invention, the wide and long label substrate and the process sheet are prepared, they are laid one upon the other by means of the adhesive layers, and by die-cutting the label substrate in a proper width for formation of a proper label width, the predetermined labels can be formed, this being very useful.

In the seventh aspect of the invention, the step 4 may include a step of printing or coating a printing ink excelled in releasability on the surface of the label substrate. In this invention, since the label substrate is rolled up for the printed layer of the label substrate and/or release layer and the adhesive layer are oppositely false-stuck to each other, the rolled label continuum is unrolled. According to this invention, the adhesive layer is formed on the release surface of the process sheet, and when it is mated with the back of the long label substrate bonded through transfer of the adhesive layer, it is possible to transfer the adhesive layer from the process sheet to the back of the long label substrate through the action of the process sheet excelled in releasability.

In the seventh aspect of the invention, the step 4 may include a step of forming the printed layer and of forming a release layer excelled in releasability on the surface of the label substrate. In this invention, since the label substrate is rolled up so that the printed layer of the label substrate and/or the release layer and the adhesive layer are false-stuck, the rolled up label continuum is unrolled. According to this invention, the adhesive layer is formed on the release surface of the process sheet and when it is mated with the back of the long label substrate which the adhesive layer is transferred and stuck to, it is possible to have the adhesive layer from the process sheet to the long label substrate by the action of the process sheet excelled in releasability.

An eighth aspect of the invention relates to a method of producing a label continuum comprising a step 1 of preparing a process sheet having at least either of its surfaces releasable and of forming an adhesive layer on the process sheet's releasable surface, a step 2 of preparing a long label substrate with its back the adhesive layer is transferred and stuck to and of mating together the back of the label substrate and the adhesive layer of the process sheet, a step 3 of forming a releasable layer on the surface of the label substrate, a step 4 of releasing only the process sheet from the surface of the adhesive layer transferred to the back of the label substrate and a step 5 of rolling up the label substrate so that the release layer and the adhesive layer are oppositely false-stuck. In the eighth aspect of the invention, since the adhesive layer is formed by the use of the process sheet having releasability in the sheet's surface, the adhesive layer is transferred to the surface of the long label substrate from the process sheet when it is mated with the long label substrate. According to the eighth aspect of the invention, when the adhesive layer formed on the release surface of the process sheet and the the surface of the long label substrate which the adhesion layer is transferred and stuck to, are mated together and since the adhesive layer is transferred from the surface of the process sheet to the back of the long label substrate, the adhesive layer can be formed even if the label substrate is relatively low in heat resistance and extremely thin. Since the adhesive layer is formed when the adhesive agent used for formation of the adhesive layer is transferred with the solvent removed, there is no risk of the label substrate affected by the solvent or the like. Hence, the width of selection for adhesives used for formation of label substrate and adhesive layer is extremely large and the invention is very suited for variegated small lot production. The process sheet can be reused many times over, this being advantageous for reuse of resources as well as for dust saving.

In the eighth aspect of the invention, the step 1 may include the step of preparing the releasable process sheet by printing or coating the sheet's surface with releasing agent. In this invention, since the adhesive layer is formed by the process sheet made releasable by printing or coating the surface of the sheet with a release agent, hence the adhesive layer is transferred from the process sheet to the surface of the long label substrate when it is put on the long label substrate surface. According to this invention, the adhesive layer is formed on the releasable surface of the process sheet and when it is mated with the back of the long label substrate which the adhesive layer is transferred and stuck to, it is possible to transfer the adhesive layer from the process sheet to the back of the long label substrate by the action of the release agent.

In the eighth aspect of the invention, the step 2 may include a step of preparing the wide and long label substrate and mating the back of the label substrate on the adhesive layer of the process sheet and rolled up after slitting in a proper width. In this invention, the adhesive layer formed on the process sheet is transferred to the back of the label substrate. When the adhesive layer is formed as a plurality of label substrates of a predetermined width, waste parts may result in the side borders but, according to the invention, first long label substrate wider than the label substrate of the predetermined width and the process sheet is prepared, and the label substrate is formed by slitting it in a proper width, the adhesive layer formed on the releasable surface of the process sheet can be formed with some excessive side parts of the process sheet can be formed, the waste parts on both sides of the process sheet can be reduced, and the label substrate of the predetermined width can be increased, this being very useful.

In the eighth aspect of invention, the steps 3 and 4 may include the step of unrolling the rolled up label substrate for formation of printed and/or release layers. In this invention, roll-like laminates of label substrate and the process sheet with an adhesive layer in between are unrolled for formation of the printed layer and/or release layer. According to this invention, it is possible to have the printed layer and/or release layer formed in the predetermined position properly, this being very useful.

The aforementioned objects, other objects, features, phases and advantages will become further apparent from reading the detailed description of the embodiments with reference to the drawings.

DESCRIPTION OF THE PREFERRED EMBODIMENTS

Figure 1A:
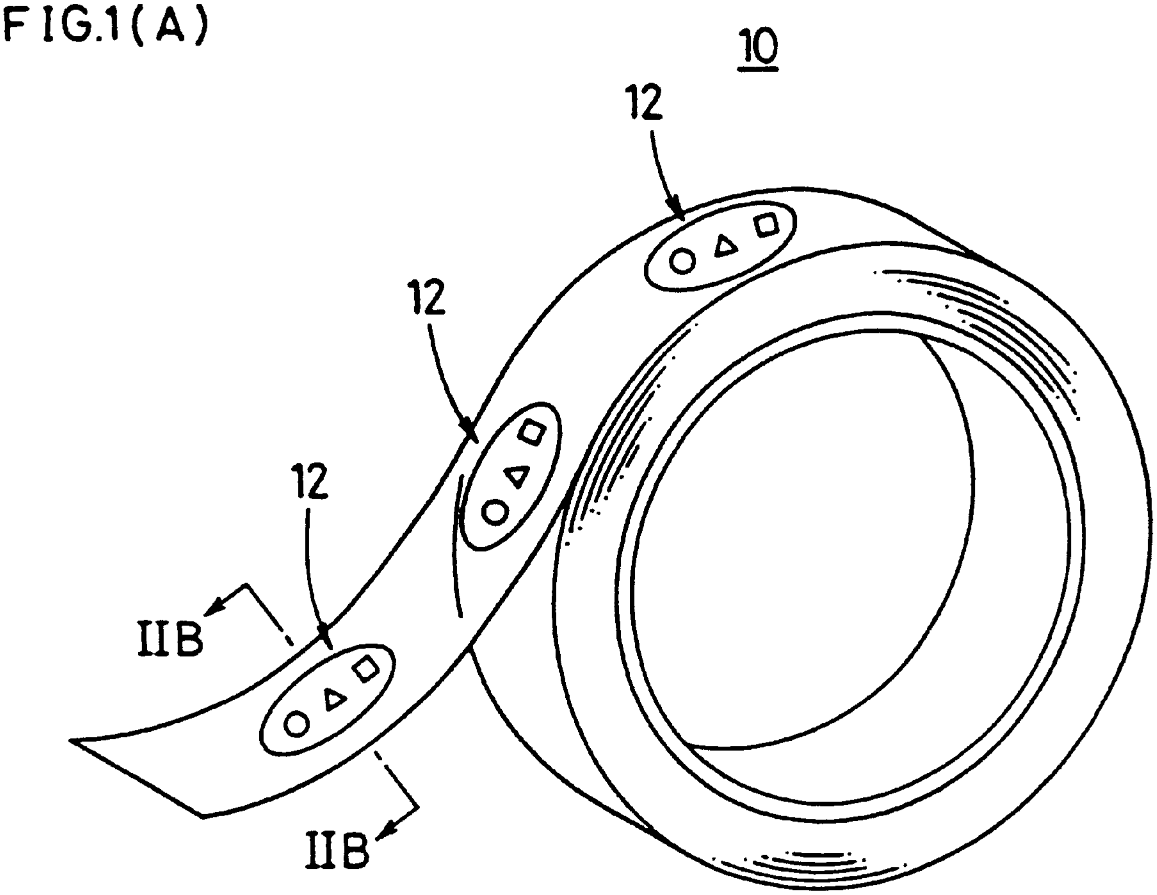
FIG. 1 is an embodiment of the present invention pertaining to a label continuum, of which (A) is a perspective view and (B) is a sectional view.
Figure 1B:
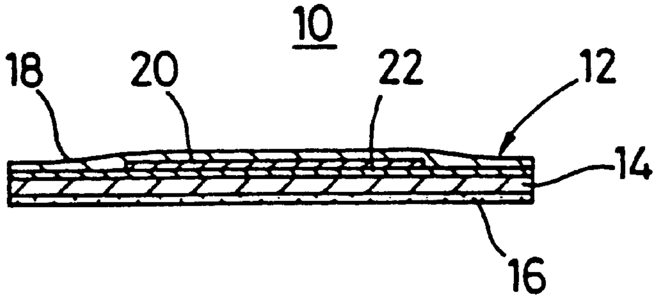

FIG. 1 is an embodiment of the present invention pertaining to a label continuum, of which (A) is a perspective view and (B) is a sectional view.

Figures 2, 2A, 2B, 2C, 2D:
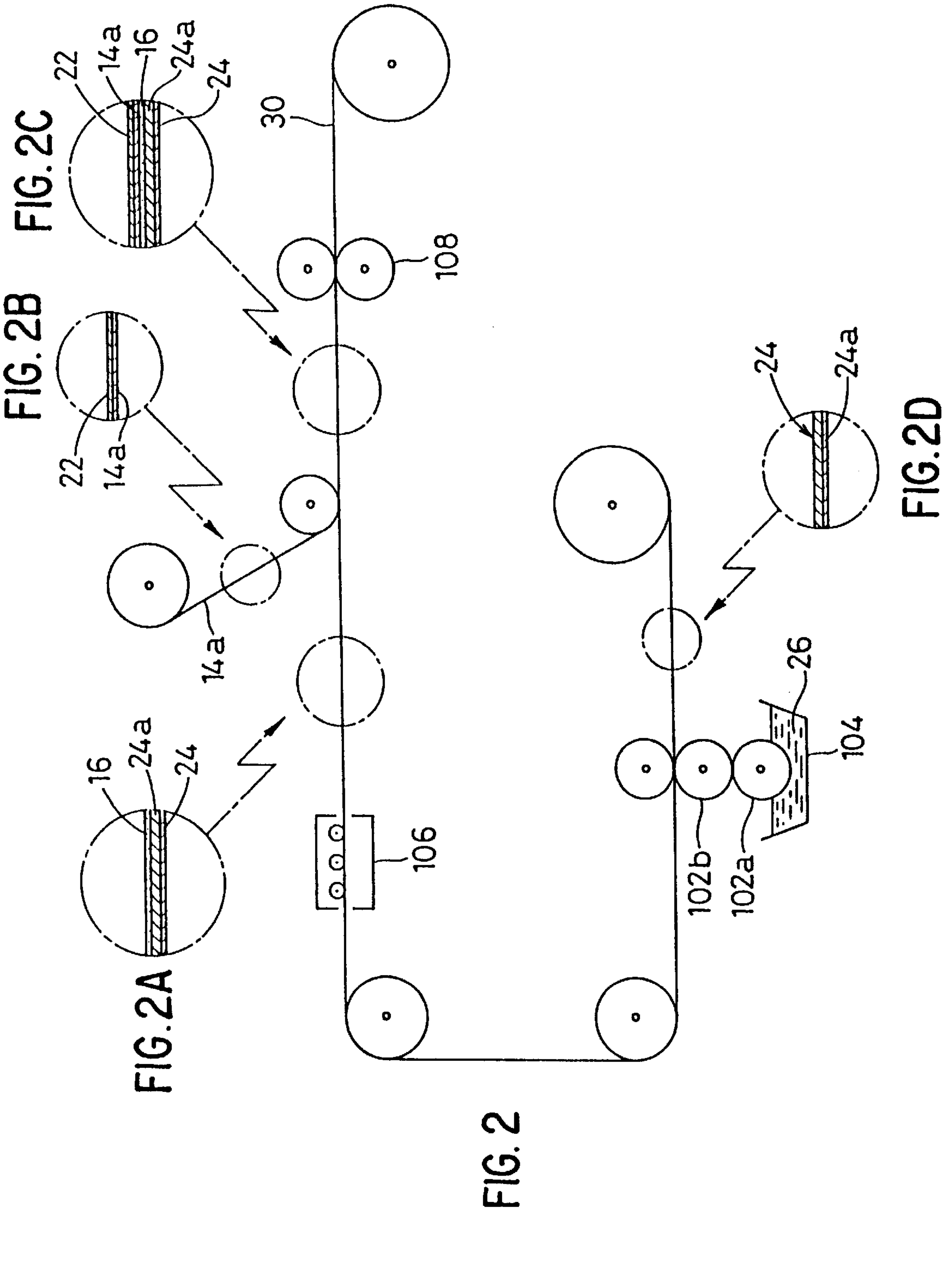
FIG. 2 is an illustratory view showing an example of the method of producing what is shown in FIG. 1, showing the first half of the process.
Figures 3, 3A, 3B, 3C, 3D, 3E:
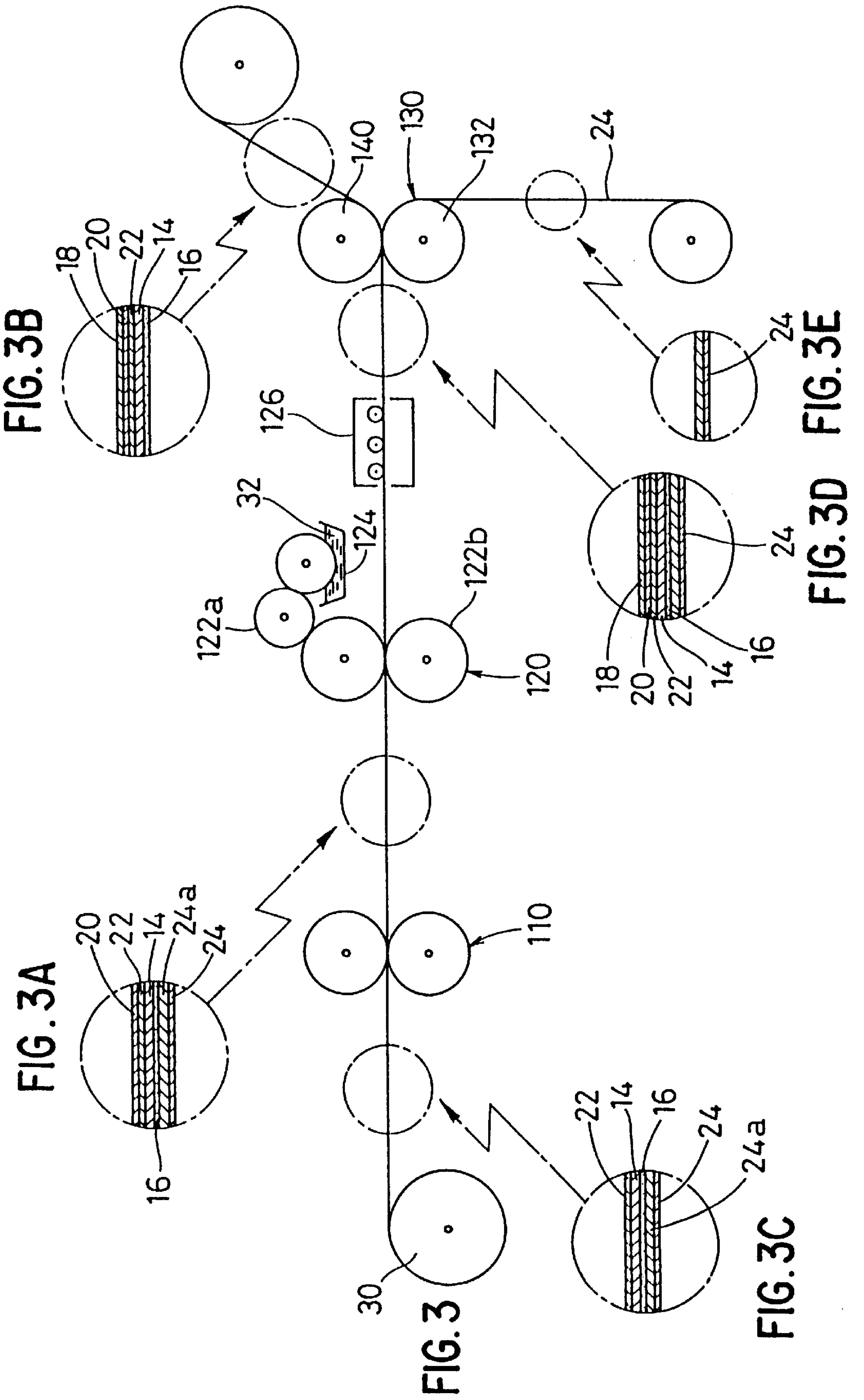
FIG. 3 is another illustratory view showing an example of the method of producing what is shown in FIG. 1, showing the second half of the process.

FIG. 2 and FIG. 3 are illustratory views showing an example of producing method shown in FIG. 1, of which FIG. 2 shows the first half of the process and FIG. 3 shows the second half thereof.

A label continuum 10 is an embodiment of the invention, forming as a belt-like repetition of a plurality of labels 12, each label 12 is separated by cutting along the border line therebetween.

The pressure sensitive adhesive layer formed by transferring to the back of a long label substrate 14, that is, an adhesive layer 16 having adhesion at the room temperature and stuck to the substrate when a low pressure is applied, the surface of the label substrate 14 has formed thereon a release layer 18 and on the surface of the label substrate 14 a release layer 18 is formed and a printed layer 20 is formed on and between the label substrates 14.

The printed layer 20 is formed intermittently, i.e. with the predetermined spaces between the expressions of adjacent labels 12 having border line therebetween.

As shown in FIG. 1 (A), the label continuum 10 is rolled up before use as labels with the release layer 18 and the adhesive layer 16 false-stuck to each other.

In this embodiment, a heat-sensitive developing layer 22 is formed on the release surface 18 of the label substrate 14.

The long label substrate 14 in this embodiment is made of, for example, paper, synthetic paper, plastic film or sheet such as of cellophane, polystyrene and polyester or aluminum foil. In order to cut the long belt type of label continuum without seams between the individual labels 12, however, such material is required to be cut by hand or proper machine such as a cutter. It is also possible to provide seams at the predetermined intervals (not shown) for cutting off each oblong label 12.

The adhesive layer 16 formed by application of an adhesive agent to the back of the label substrate 14 is for imparting adhesive force to each label 12 and for this purpose known adhesive agents such as of acrylic copolymer or rubber-type adhesive agent are used.

The heat-sensitive developing layer 22 is formed on the surface of the label substrate 14 by coating and drying a heat-sensitive developing agents including a mixture of e.g. transparent or single-color leuco dyes, acid substance and binders. As leuco dyes may be cited, for example, crystal violet lactone, 3-indolino-3-P-dimethylaminonphenyl-6-dimethylaminophthalid, 3-diethylamino-7-chlorofluoran, 2-diethylamino-7-cyclohexylaminofluoran, 3-diethylamino-5-methyl-7-t-buthylfluoran, 3-diethylamino-6-methyl-7-anilinofluoran, and 3-diethylamino-6-methyl-7-P-butylanilinofluoran.

As acid substances may be cited, for example, 2,2-bis (4'-oxyphenyl) propane, 4-phenylphenol, 4-hydroxyacetophenone, 2,2'-dihydroxydiphenyl, 2,2'-methylene bis (4-methyl-6-t-butylphenol), 4,4'-isopropylidenediphenol, 4,4'-isopropyriden bis (2-chlorophenol), 4,4'-isopropyridene bis (2-methylphenol), 4,4'-ethylene bis (2-methylphenol) and 4,4'-thiobis (6-t-buthyl-3-methylphenol).

As binders may be cited, for example, aqueous solution or emulsion of polyvinyl alcohol, methoxy cellulose, hydroxyethyl cellulose, carboxymethyl cellulose, polyacrylamide, polyacrylic acid, starch, gelatin, polystyrene, vinyl chloride-acetic acid vinyl copolymer.

The heat-sensitive developing layer 22 is developed when heated by the thermal head etc. of a printer.

On the surface of the heat-sensitive developing layer 22 of the label substrate 14, the printed layer 20 is formed for expression on the display parts of the individual labels 12 at the predetermined intervals with the border lines therebetween. This printed layer 20 is formed using a general printing ink by a known printing method such as planographic printing, relief printing or offset printing.

The release layer 18 on the surface of the label substrate 14 over the heat-sensitive developing layer 22 and the printed layer 20 is formed by printing or coating of the release agent such as silicone resin which, for instance, can be cured without affecting the heat-sensitive developing layer 22.

In this embodiment, may preferably be selected as the release agent constituting the release layer 18 UV silicone (the so-called silicone of the UV-hardening type) and EB silicone (the so-called silicone of the electronic ray curing type) being cured by UV or electronic ray without affecting the heat-sensitive developing layer 22.

The release layer 18 may be formed by laminating and bonding a film or sheet excelled in releasability.

Then, an example of the producing method of what is shown in FIG. 1 will be described with reference mainly to FIG. 2 and FIG. 3.

First, a rolled up long belt-like process sheet 24 made of rolled paper, plastic film or sheet is provided. This process sheet 24 is used only in the producing process only and is no longer included in the finished label continuum 10. On the surface of the process sheet 24 is formed a release layer 24*a* made by printing or coating a release agent such as silicone resin or fluorine resin.

Then an adhesive agent 26 for formation of the adhesive layer 16 is printed or applied to the surface of the release layer 24*a* of the process sheet 24. An adhesive coating device 100 includes two rollers 102*a* and 102*b*. The roller 102*a* has its lower part dipped in the adhesive agent 26 in a pan 104.

Hence, by rotating the roller 102*a* and 102*b*, the adhesive agent 26 is printed on or applied to the surface of the release layer 24*a* of the process sheet 24 led to the position.

As adhesive agent coating device may as well be used a gravure roll coater, reverse roll coater or air knife coater and a known printing machine such as a screen printing machine may also be used.

The process sheet 24 printed or coated with the adhesive layer 26 may be led to a drier 106 including, for example, a heater. In the dryer 106, the adhesive agent 26 printed or coated on the process sheet 24 is dried for formation of the adhesive layer 16. When as the adhesive agent 26 one of water-soluble aqueous resin such as of EVA type, vinyl acetate type and acrylic type or solvent type adhesive agent comprising polyvinyl chloride, urethane, acryl etc., a dryer is used, while a cooler is to be used when the adhesive agent used is of the hot melt type such as of the rubber type or EVA type.

On the release layer 24*a* of the process sheet 24 the adhesive layer 16 is formed on the back thereof, paper 14*a* as the label substrate 14 is laminated.

The paper 14*a* of the label substrate 14, too, is formed in the same width as that of the process sheet 24 and on the surface of the paper 14*a* as the label substrate 14 is already formed the heat-sensitive developing layer 22.

The heat-sensitive developing layer 22 is formed on the side opposite to the aforementioned adhesive layer 26.

Thus, the laminate of the process sheet 24, adhesive layer 16 and the label substrate 14 is, before it is led to the next printing process or the like, slit in approximately the same width as the width of the label continuum 10 as the final product by a slitter 108 and then rolled up after slitting.

A laminate 30 of the process sheet 24 and the label substrate 14 is false-stuck by the adhesive layer 16 and rolled up and led to the next step of printing and release agent coating device shown in FIG. 3.

Next, the rolled up laminate 30 is loaded on the production system shown in FIG. 3, the laminate 30 is unrolled and led to the printing device 110 for formation of the printed layer 20. This printing device 110 is for printing the expression constituting each label 12, for example, letters such as trade name, proper patterns etc. by a known printing device for planographic, relief printing or offset printing.

The laminate 30 with printed layer 20 thereon is led to a release agent coating device 120 to have the release layer 18 formed on the surface of the printed layer 20 on the label substrate 14. This release agent coating device 120 is made up of a main roller 122*a* and a roller 122*b* formed opposite to the main roller 122*a*. The main roller 122*a* has its lower part dipped in a dissolved release agent 32 in a pan 124 and the release agent 32 is applied by the main roller 122*a* to the surface of the label substrate 14 of the laminate 30 passing through between the main roller 122*a* and the roller 122*b*.

The laminate 30 printed or coated with the release agent 32 is moved to a dryer 126 including e.g. a heater. In the dryer 126, the release agent 32 printed or coated on the laminate is dried and the release layer 18 is formed. The label continuum 10 of the laminate 30 with release layer 18 formed thereon is led to the process sheet removing device 130. This process sheet removing device 130 includes a roller 132 and peels the process sheet 24 off from the surface of the adhesive layer 16 of the laminate 30 and the peeled process sheet 24 is rolled up for reuse.

Meanwhile, the laminate 30 (minus the peeled off process sheet 16) and constituting the label continuum 10 is rolled up with its both sides or either side being slit by a slitter 140 to make its width to be optimum. It may as well be possible to die-cut the label substrate 14, adhesive layer 16, printed layer 10 and heat-sensitive developing layer 22 only to be finished by cutting.

Figure 4:
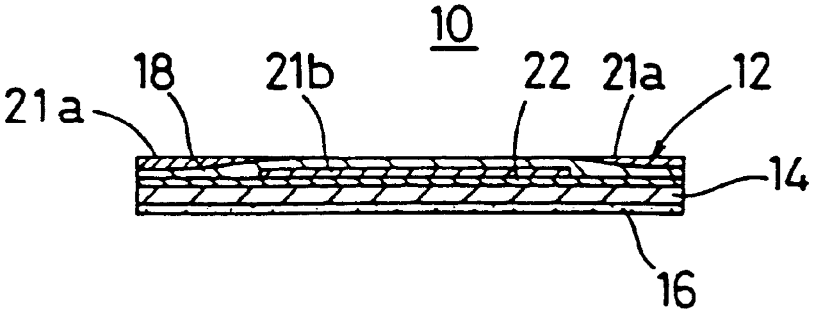
FIG. 4 is a sectional view of a label continuum as another embodiment of the invention.
Figures 5, 5A, 5B, 5C, 5D, 5E:
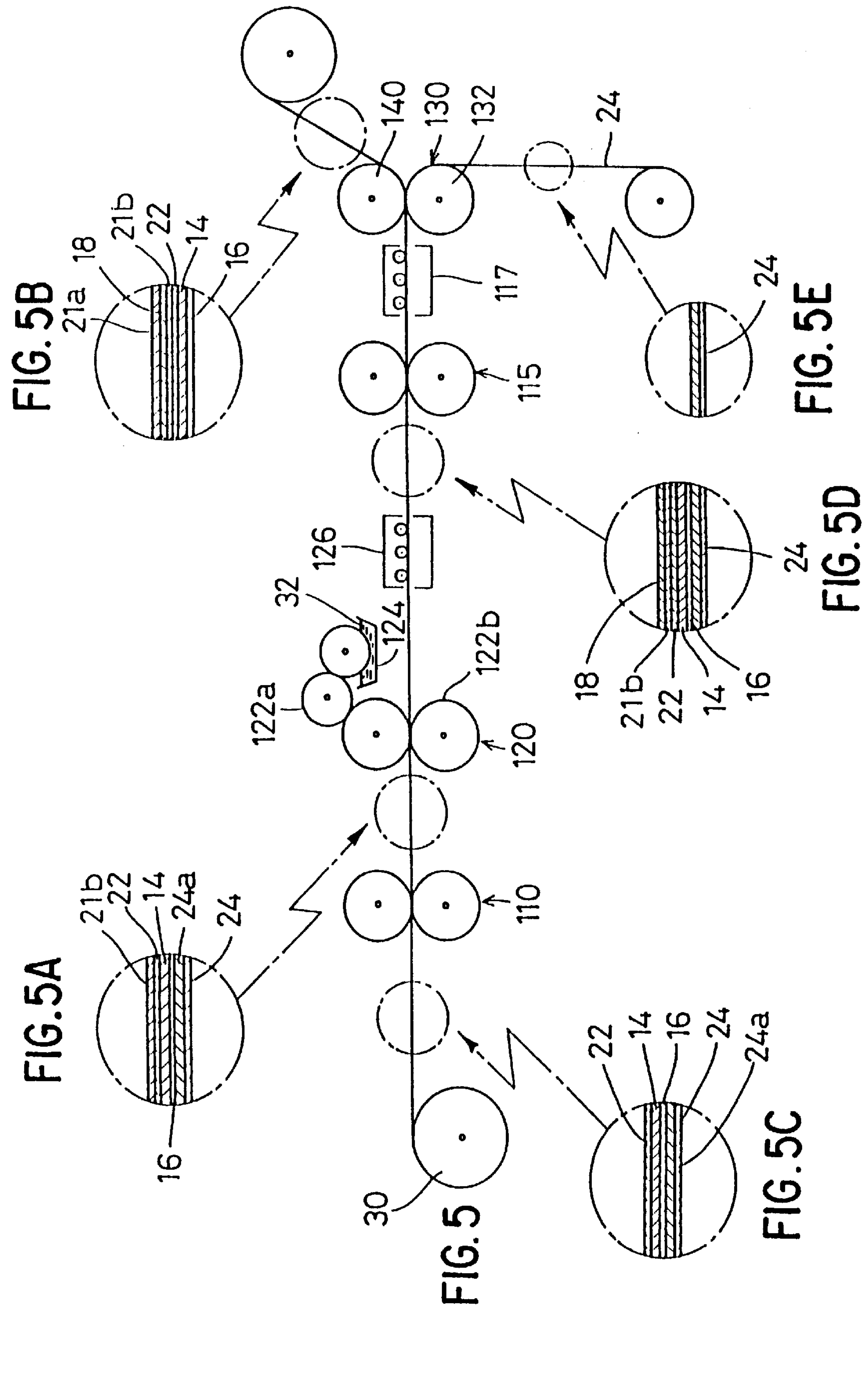
FIG. 5 is an illustratory view showing another example of method of producing what is shown in FIG. 4.

FIG. 4 is a sectional view of the label continuum as another embodiment of the present invention, and FIG. 5 is an illustratory view showing another example of method of producing what is shown in FIG. 4.

In the label continuum 10 of this embodiment, a first printed layer 21*a* is formed by a printing ink excelled in releasability where the release layer 18 is not formed on the surface of the label substrate 14 and a second printed layer 21*b* is formed in a portion of the surface of the label substrate 14 between the release layer 18 and the label substrate 14. In this embodiment, too, the heat-sensitive developing layer 22 is formed on the surface of the release layer surface 18 side of the label substrate 14. This means that the release layer 18 is formed on the surface of the label substrate 14, that is to say, on the surface of the surface of the heat-sensitive layer 22 and the second printed layer 21*b*.

The second printed layer 21*b* is formed with an ordinary printing ink and is formed intermittently at a constant distance between the expression of the individual labels 12 so that the expression of each label 12 is formed apart from its border line.

That is to say, in this embodiment is shown on the surface of the heat-sensitive developing layer 22 the second printed layer 21*b* forming the expression of each label 12 apart from its border line. This second printed layer 21*b* is printed and formed with an ordinary printing ink by a known method of printing such as planographic, relief printing and offset printing. However, this second printing layer 21*b* may not be formed.

Of the label continuum 10 shown in FIG. 4, the laminate 30 of the label substrate 14 and the process sheet 24 for the first half of the producing process is produced by the same device as shown in FIG. 2, the producing device for the second half of the producing process for the label continuum 10 shown in FIG. 4 is shown in FIG. 5.

The rolled laminate 30 is loaded in the producing device shown in FIG. 5 and is unrolled and led to a printing device 110 for formation of the second printed layer 21*b*. This printing device 110 is for printing the expression constituting each label 12 and, for example, letters such as trade name and proper pattern are printed by a known printing device such as planographic, relief printing and offset printing machine.

Then, the laminate 30 with the second printed layer 21*b* formed thereon is led to a release agent coating device 120 for forming the release layer 18 on the surface of the second printed layer 21*b*. This release agent coating device 120 includes the main roller 122*a* and the roller 122*b* formed opposite to the main roller 122*a*. And, the main roller 122*a* has its lower part dipped in the release agent 32 in the pan 124 and the release agent 32 is applied to the laminate 30 through between the main roller 122*a* and the roller 122*b* by means of the main roller 122*a*.

The laminate 30 with the release agent 32 printed on or applied to is moved to the dryer 126 including, for example, a heater. In the drier 126, the release agent 32 printed on or applied to the laminate is dried to form the release layer 18.

Then, the laminate 30 is led to a printing device 115 for forming the first printed layer 21*a* with a printing ink excellent in releasability where the second printed layer 21*b* is not formed. The laminate 30 with the first printed layer 21*a* formed thereon is sent to a dryer 117.

Thereafter, the label continuum 10 formed by lamination of the first printed layer 21*a,* the release layer 18 and the laminate 30 is led to a process sheet removing device 130. The process sheet removing device 130 includes the roller 132, and the process sheet 24 is removed from the surface of the adhesive layer 16 of the laminate 30 and rolled up for reuse.

Meanwhile, the laminate 30 (minus the peeled off process sheet 16) and constituting the label continuum 10 is rolled up with its both side or either side being slit by the slitter 140 with its width to become optimum. Instead of slitting die-cutting may be possible.

Figure 6:
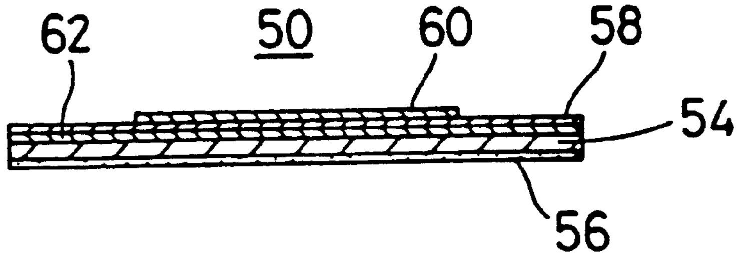
FIG. 6 is a sectional view showing another embodiment of the invention pertaining to a continuum of label.
Figures 7, 7A, 7B, 7C, 7D, 7E:
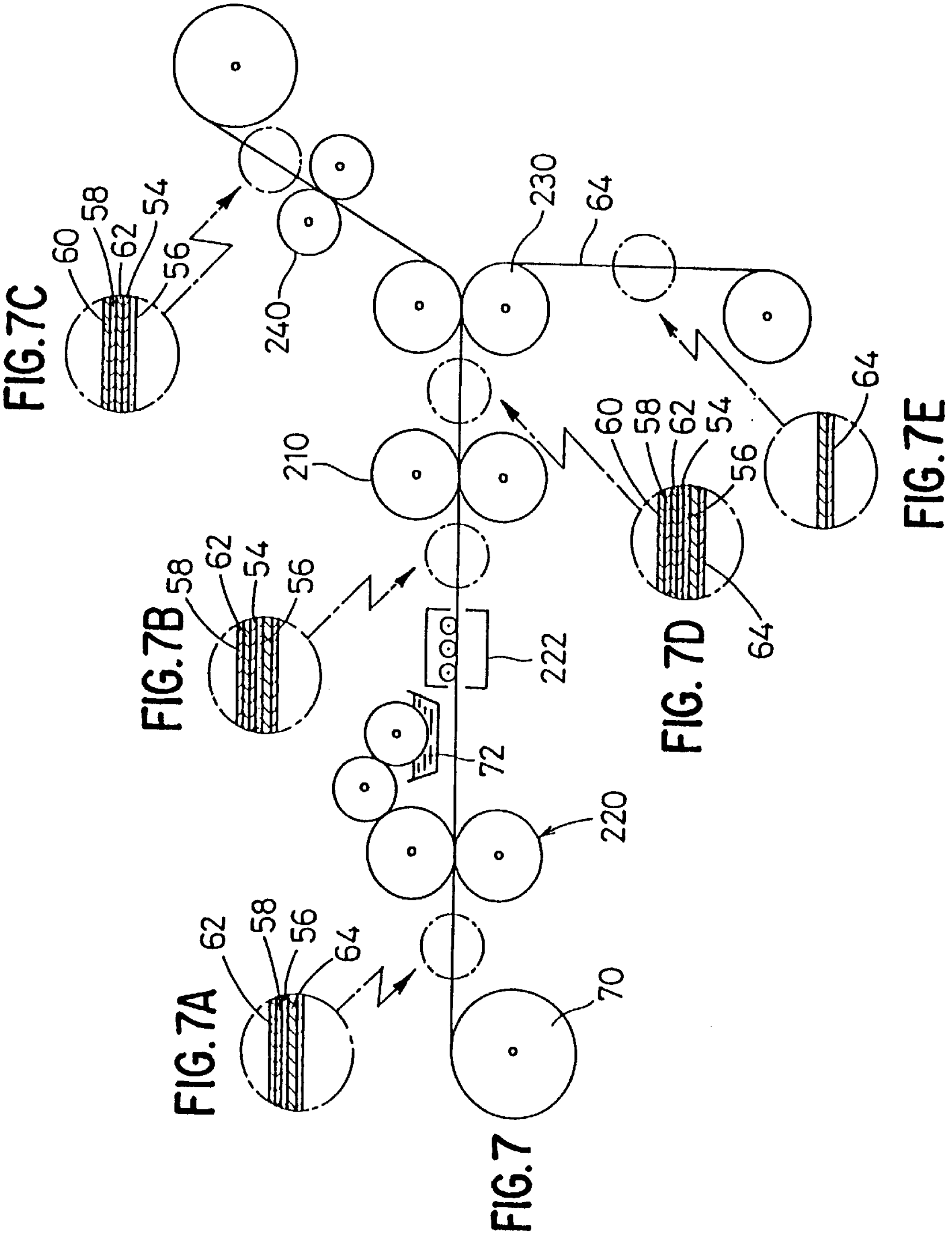
FIG. 7 is an illustratory view showing an example of method of producing what is shown in FIG. 6.

FIG. 6 is a sectional view of the label continuum as another embodiment of the invention, FIG. 7 is an illustratory view showing an example of method of producing what is shown in FIG. 6.

This label continuum 50 has a release layer 58 formed on the surface of a label substrate 54, being different from the examples shown in FIGS. 1 and 4. Further, a first printed layer 60 is formed on the surface of the release layer 58. It is same as in the examples shown in FIG. 1 and FIG. 4 that an adhesive layer 56 is formed on the back of the label substrate 54, and it is also same as in the examples shown in FIG. 1 and FIG. 4 that a heat-sensitive developing layer 62 is formed on the surface of the label substrate 54.

As the printing ink for formation of the first printed layer 60, it is necessary to select one having releasability itself.

As to the label continuum 50 shown in FIG. 6, a laminate 70 of the label substrate 54 and a process sheet 64 for the first half of the production process is produced by the same device as shown in FIG. 2. The production device for the second half of the production process for the label continuum 50 shown in FIG. 6 is so arranged that a release agent 72 is printed on or applied to the surface of the label substrate 54 of the laminate 70 by means of a release agent coating device 220 and the release agent 72 so printed or applied to is cured by the curing device for formation of the release layer 58 and downstream the printed layer 60 is formed on the release layer 58 by the use of a printing device 210, as shown in FIG. 7.

In FIG. 7, different from FIGS. 3 and 5, a slitter 240 for slitting the label substrate 54 for its width adjusted to the optimum width of the label continuum 50 is positioned downstream immediately before rolling up but after the process sheet 64 is stripped from the pressure sensitive type adhesive layer 56 by a process sheet removing device 230.

Having described our invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A method of producing a label continuum of the type in which a printed layer is applied to a heat sensitive developing layer and in which the heat sensitive developing layer is capable of being developed and printed when the label continuum is used comprising:

providing a process sheet (24);

applying a first release layer (24*a*) to one side of the process sheet (24);

applying a releasable adhesive layer (16) to the first release layer (24*a*);

applying to said adhesive layer (16) a substrate layer (14*a*) and a heat sensitive developing layer (22) in which the substrate layer (14*a*) is adhered to the heat sensitive developing layer (22) and the substrate layer 14*a* is adhered to the releasable adhesive layer (16);

applying a printed layer (20) to at least portions of said heat sensitive developing layer (22);

applying a second release layer (18) to said printed layer (2) to thereby form a first composite continuum (18, 20, 22, 14, 16, 24*a*, 24);

peeling said process sheet (24) and said first release layer (24) from said releasable adhesive layer (16) of said first composite continuum (18, 20, 22, 14, 16, 24*a*, 24) to obtain a second composite continuum (18, 20, 22, 14, 16) in which the releasable adhesive layer (16) and the second release layer (18) are disposed on the outer opposite sides of said second composite continuum (18, 20, 22, 14, 16); and rolling up said second composite continuum (18, 20, 22, 14, 16) into a roll in which said outer releasable adhesive layer (16) temporarily adheres to the outer second release layer (18) until the second composite continuum (18, 20, 22, 14, 16) is ready for use.

2. A method according to claim 1 wherein said step of applying said first release layer (24*a*) to one side of said process sheet (24) and said step of applying said releasable adhesive layer (16) to said first release layer (24*a*) forms a first multi-layer laminate (16, 24*a*, 24) and further comprising applying said heat sensitive developing layer (22) to said substrate layer (14*a*) to form a second multi-layer laminate (22, 14*a*), said step of applying to said releasable adhesive layer (16) the substrate layer (14*a*) and the heat sensitive developing layer (22) comprising applying said second multi-layer laminate (22, 14*a*) to said first multi-layer laminate (16, 24*a*, 24).

3. A method according to claim 1 wherein said step of applying a printed layer (20) to at least portions of said heat sensitive developing layer (22) comprises applying the printed layer (20) to first portions (12) of the heat sensitive developing layer (22) to thereby obtain printed layer sections (12), said heat sensitive developing layer (22) having second portions to which said printed layer (20) has not been applied, said step of applying said second release layer (18) including applying said second release layer (18) to said printed layer sections (12) and to said second portions of said heat sensitive developing layer (22) to which said printing layer has not been applied.

4. A method according to claim 3 wherein the step of applying the printed layer (20) to first portions (12) of the heat sensitive developing layer (22) comprises applying the printed layer (20) to a plurality of spaced first portions (12) of the heat sensitive developing layer (22) to thereby obtain a plurality of printed layer sections (12) which are spaced from one another.

5. A method according to claim 1 wherein said step of applying said first release layer (24*a*) to one side of said process sheet (24) forms a first laminate (24*a*, 24), said peeling step including peeling said first laminate (24*a*, 24) from said first composite continuum (18, 20, 22, 14, 16, 24*a*, 24), and further comprising recycling said first laminate (24*a*, 24) for producing a plurality of rolls of said continuum.

6. A method of producing a label continuum of the type in which a printed layer is applied to a heat sensitive developing layer and in which the heat sensitive developing layer is capable of being developed and Printed when the label continuum is used comprising:

providing a process sheet (24);

applying a release layer (24*a*) to one side of the process sheet (24);

applying a releasable adhesive layer (16) to the release layer (24*a*);

applying to said releasable adhesive layer (16) a substrate layer (14*a*) and a heat sensitive developing layer (22) in which the substrate layer (14*a*) is adhered to the heat sensitive developing layer (22) and the substrate layer 14*a* is adhered to the releasable adhesive layer (16);

applying a printed layer (20) to said heat sensitive developing layer (22) to form a first composite continuum (20, 22, 14, 16, 24*a*, 24);

peeling said process sheet (24) and said release layer (24*a*) from said releasable adhesive layer (16) of said first composite continuum (20, 22, 14, 16, 24*a*, 24) to obtain a second composite continuum (20, 22, 14, 16) in which the releasable adhesive layer (16) and the printed layer (20) are disposed on the outer opposite sides of said second composite continuum (20, 22, 14, 16); and rolling up said second composite continuum (20, 22, 14, 16) into a roll in which said outer releasable adhesive layer (16) temporarily adheres to the outer printed layer (20) until the second composite continuum (20, 22, 14, 16) is ready for use.

7. A method of producing a label continuum of the type in which a printed layer is applied to a heat sensitive developing layer and in which the heat sensitive developing layer is capable of being developed and printed when the label continuum is used comprising:

providing a process sheet (24);

applying a first release layer (24*a*) to one side of the process sheet (24);

applying a releasable adhesive layer (16) to the first release layer (24*a*);

applying to said releasable adhesive layer (16) a substrate layer (14*a*) and a heat sensitive developing layer (22) in which the substrate layer (14*a*) is adhered to the heat sensitive developing layer (22) and the substrate layer 14*a* is adhered to the releasable adhesive layer (16);

applying a second release layer (18) to said heat sensitive developing layer (22) to thereby form a first composite continuum (18, 22, 14, 16, 24*a*, 24);

peeling said process sheet (24) and said first release layer (24*a*) from said releasable adhesive layer (16) of said first composite continuum (18, 22, 14, 16, 24*a*, 24) to obtain a second composite continuum (18, 22, 14, 16) in which the releasable adhesive layer (16) and the second release layer (18) are disposed on the outer opposite sides of said second composite continuum (18, 22, 14, 16); and rolling up said second composite continuum (18, 20, 22, 14, 16) into a roll in which said outer releasable adhesive layer (16) temporarily adheres to the outer second release layer (18) until the second composite continuum (18, 22, 14, 16) is ready for use.

8. A method of producing a label continuum of the type in which a printed layer is applied to a heat sensitive developing layer and in which the heat sensitive developing layer is capable of being developed and printed when the label continuum is used comprising:

providing a process sheet (24);

applying a first release layer (24*a*) to one side of the process sheet (24);

applying a first releasable adhesive layer (16) to the first release layer (24*a*);

applying to said first releasable adhesive layer (16) a substrate layer (14*a*) and a heat sensitive developing layer (22) in which the substrate layer (14*a*) is adhered to the heat sensitive developing layer (22) and the substrate layer 14*a* is adhered to the releasable adhesive layer (16);

applying a first printed layer (21*b*) to at least portions of said heat sensitive developing layer (22) to form a first composite continuum (21*b*, 22, 14, 24*a*, 24);

applying a second release layer (18) to said first composite continuum (21*b*, 22, 14, 16, 24*a*, 24) to thereby form a second composite continuum (18, 21*b*, 22, 14, 16, 24*a*, 24);

applying a second printed layer (21*a*) to at least portions of said second release layer (18) of said second composite continuum (18, 21*b*, 22, 14,16, 24*a*, 24) to thereby form a third composite continuum (21*a*, 18, 21*b*, 22, 14, 16, 24*a*, 24), said second printed layer (21*a*) being a releasing printed layer (21*a*);

peeling said process sheet (24) and said first release layer (24*a*) from said releasable adhesive layer (16) of said third composite continuum (21*a*, 18, 21*b*, 14, 16, 24*a*, 24) to obtain a fourth composite continuum (21*a*, 18, 21*b*, 22, 14, 16) in which the first releasable adhesive layer (16) and the second releasing printed layer (21*a*) are disposed on the outer sides of said fourth composite continuum (21*a*, 18, 21*b*, 22, 14, 16); and rolling up said fourth composite continuum (21*a*, 18, 21*b*, 22, 14, 16) into a roll in which said outer first releasable adhesive layer (16) temporarily adheres to the outer second releasing printed layer (21*a*) until the fourth composite continuum (21*a*, 18, 21*b*, 22, 14, 16) is ready for use.

9. A method according to claim 8 wherein said step of applying said first release layer (24) to one side of said process sheet (24) and said step of applying said first releasable adhesive layer (16) to said first release layer (24*a*) forms a first multi-layer laminate (16, 24*a*, 24), and further comprising applying said heat sensitive developing layer (22) to said substrate (14) to form a second multi-layer laminate (22, 14), said step of applying to said first releasable adhesive layer (16) the substrate layer (14) and the heat sensitive developing layer (22) comprising applying said second multi-layer laminate (22, 14) to said first multi-layer laminate (16, 24*a*, 24).

10. A method according to claim 8 wherein said step of applying said first printed layer (213*b*) to at least portions of said heat sensitive developing layer (22) comprises applying the first printed layer (21*b*) to first portions of the heat sensitive developing layer (22) to thereby obtain printed layer sections (21*b*), said heat sensitive developing layer (22) having second portions to which said first printed layer (21*b*) has not been applied, said step of applying said second release layer (18) including applying said second release layer (18) to said printed layer sections (21*b*) and to said second portions of said heat sensitive developing layer (22) to which said first printing layer (21*b*) has not been applied.

11. A method according to claim 10 wherein said step of applying said second printed layer (21*a*) includes applying said second printed layer (21*a*) to those portions of said second release layer (18) which have an overlapping relationship with said second portions of said heat sensitive developing layer (22) to which said first printed layer (21*a*) has not been applied.

12. A method according to claim 11 wherein the step of applying the second printed layer (21*a*) to those portions of said second release layer (18) which have an overlapping relationship with said second portions of said heat sensitive developing layer (22) to which said first printed layer (21*b*) has not been applied comprises applying the second printed layer (21*a*) to a plurality of spaced first portions of the heat sensitive developing layer (22) to thereby obtain a plurality of spaced printed layer sections (21*b*) which are spaced from one another.

13. A method according to claim 8 wherein said step of applying said first release layer (24*a*) to one side of said process sheet forms (24) a first laminate (24*a*, 24), said peeling step including peeling said first laminate (24*a*, 24) from said first composite continuum (18, 20, 22, 14, 16, 24*a*, 24), and further comprising recycling said first laminate (24*a*, 24) for producing a plurality of rolls of said continuum.

14. A method of producing a label continuum of the type in which a printed layer is applied to a heat sensitive developing layer and in which the heat sensitive developing layer is capable of being developed and printed when the label continuum is used comprising:

providing a process sheet (24);

applying a first release layer (24*a*) to one side of the process sheet (24);

applying a first releasable adhesive layer (16) to the first release layer (24*a*);

applying to said first releasable adhesive layer (16) a substrate layer (14*a*) and a heat sensitive developing layer (22) in which the substrate layer (14*a*) is adhered to the heat sensitive developing layer (22) and the substrate layer (14*a*) is adhered to the first releasable adhesive layer (16);

applying a printed layer (21*b*) to at least portions of said heat sensitive developing layer (22) to form a first composite continuum (21*b,* 22, 14, 24*a*, 24);

applying a second release layer (18) to said first composite continuum (21*b,* 22, 14, 16, 24*a*, 24) to thereby form a second composite continuum (18, 21*b,* 22, 14, 16, 24*a*, 24);

peeling said process sheet (24) and said first release layer (24*a*) from said first releasable adhesive layer (16) of said second composite continuum (18, 21*b*, 22, 14, 16, 24*a*, 24) to obtain a third composite continuum (18, 21*b*, 22, 14, 16) in which the first releasable adhesive layer (16) and the second release layer (18) are disposed on the outer sides of said third composite continuum (18, 21*b,* 22, 14, 16); and rolling up said third composite continuum (18, 21*b,* 22, 14, 16) into a roll in which said outer first releasable adhesive layer (16) temporarily adheres to the outer second release layer (18) until the third composite continuum (18, 21*b,* 22, 14, 16) is ready for use.

15. A method of producing a label continuum of the type in which a printed layer is applied to a heat sensitive developing layer and in which the heat sensitive developing layer is capable of being developed and printed when the label continuum is used comprising:

providing a process sheet (24);

applying a first release layer (24*a*) to one side of the process sheet (24);

applying a first releasable adhesive layer (16) to the first release layer (24*a*);

applying to said first releasable adhesive layer (16) a substrate layer (14*a*) and a heat sensitive developing layer (22) in which the substrate layer (14*a*) is adhered to the heat sensitive developing layer (22) and the substrate layer (14*a*) is adhered to the first releasable adhesive layer (16);

applying a second release layer (18) to said heat sensitive developing layer (22) to thereby form a first composite continuum (18, 22, 14, 16, 24*a*, 24);

applying a printed layer (21*a*) to at least portions of said second release layer (18) of said first composite continuum (18, 22, 14, 16, 24*a*, 24) to thereby form a second composite continuum (21*a,* 18, 22, 14, 16, 24*a*, 24, said printed layer (21*a*) being a releasing printed layer (21*a*);

peeling said process sheet (24) and said first release layer (24*a*) from said first releasable adhesive layer (16) of said second composite continuum (21*a,* 18, 22, 14, 16, 24*a*, 24) to obtain a third composite continuum (21*a,* 18, 22, 14, 16) in which the first releasable adhesive layer (16) and the releasing printed layer (21*a*) are disposed on the outer sides of said third composite continuum (21*a,* 18, 22, 14, 16); and rolling up said third composite continuum (21*a,* 18, 22,14,16) into a roll in which said outer first releasable adhesive layer (16) temporarily adheres to the outer releasing printed layer (21*a*) until the third composite continuum (21*a*, 18, 22, 14, 16) is ready for use.

16. A method of producing a label continuum of the type in which a printed layer is applied to a heat sensitive developing layer and in which the heat sensitive developing layer is capable of being developed and printed when the label continuum is used comprising:

providing a process sheet (64);

applying a first releasable adhesive layer (56) to the process sheet (64);

applying to said fist releasable adhesive layer (56) a substrate layer (54) and a heat sensitive developing layer (62) in which the substrate layer (54) is adhered to the heat sensitive developing layer (62) and the substrate layer (54) is adhered to the first releasable adhesive layer (54);

applying a second release layer (58) to said heat sensitive developing layer (62);

applying a releasable printed layer (60) to at least portions of said second layer (58) to form a first composite continuum (64, 56, 54, 62, 58, 60);

peeling said process sheet (64) from said first composite continuum (64, 56, 54, 62, 58, 60) to obtain a second composite continuum (56, 54, 62, 58, 60), the printed layer (60) and the first releasable adhesive layer (56) being disposed on the opposite outer sides of said second composite continuum (56, 54, 62, 58, 60);

rolling up said second composite continuum (56, 54, 62, 58, 60) into a roll in which said outer first releasable adhesive layer (56) temporarily adheres to the outer releasable printed layer (60) until the second composite continuum (56, 54, 62, 58, 60) is ready for use.

17. A method according to claim 16 wherein said step of applying said first releasable adhesive layer (56) to said process sheet (64) forms a first multi-layer laminate (64, 56), and further comprising applying said heat sensitive developing layer (62) to said substrate layer (54) to form a second multi-layer laminate (54, 62), said step of applying to said first releasable adhesive layer (56) the substrate layer (54) and the heat sensitive developing layer (62) comprising applying said second multi-layer laminate (54, 62) to said first multi-layer laminate (64, 56).

18. A method according to claim 17 wherein said step of applying said printed layer (60) to at least portions of said second release layer (58) comprises applying the printed layer (60) to first spaced portions of the second releasable layer (58) to thereby obtain a plurality of spaced printing layer sections (60), said second release layer (58) having second portions to which said printed layer (60) has not been applied.

19. A method according to claim 16 further comprising recycling said peeled process sheet (64) for producing a plurality of rolls of said continuum.

* * * * *